J. H. CRAIG.
CLAMP.
APPLICATION FILED MAR. 21, 1914.
1,112,679.
Patented Oct. 6, 1914.
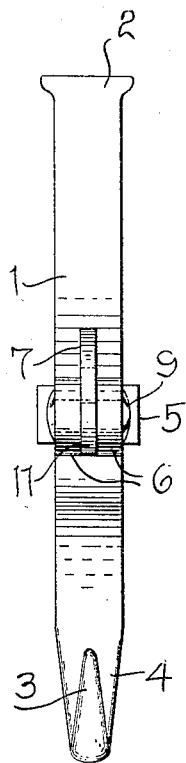
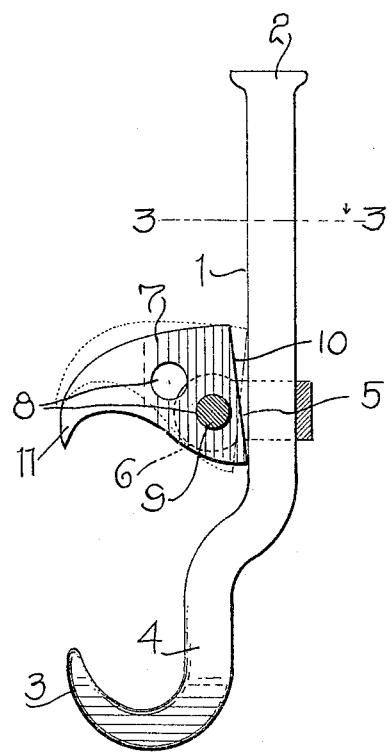
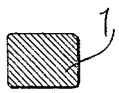
Witnesses
Robert M. Sutphen
V. J. Dowrick.
Inventor
J. H. Craig
By Watson E. Coleman
Attorney

UNITED STATES PATENT OFFICE.

JAMES HARRY CRAIG, OF RIMER, PENNSYLVANIA.

CLAMP.

1,112,679.  Specification of Letters Patent.  Patented Oct. 6, 1914.

Application filed March 21, 1914. Serial No. 826,301.

*To all whom it may concern:*

Be it known that I, JAMES HARRY CRAIG, a citizen of the United States, residing at Rimer, in the county of Armstrong and State of Pennsylvania, have invented certain new and useful Improvements in Clamps, of which the following is a specification, reference being had to the accompanying drawings.

This invention relates to new and useful improvements in clamps and more particularly to what is known as a tong clamp, the main object of the invention being to provide an adjustable clamp which is adapted for application to the handles of any well known form of tongs such as ice tongs, blacksmiths' tongs and the like so as to securely clamp the tongs to any object to which they might be applied, said clamp being readily adjusted to adapt the same to various sized objects.

Another object of the invention is the provision of a clamp of the above character which will possess advantages in points of efficiency and durability, is inexpensive to manufacture and at the same time is simple in construction and operation.

With the above and other objects in view, the invention consists in the novel features of construction and the combination and arrangement of parts to be hereinafter more fully described, pointed out in the claim and shown in the accompanying drawings, in which—

Figure 1 is a front elevation of a clamp constructed in accordance with my invention; Fig. 2 is a side elevation, parts being broken away and in section; Fig. 3 is a transverse sectional view of the shank taken on the line 3—3 of Fig. 2.

In the construction of my improved clamp, I provide a shank 1 having an annular enlarged head 2 formed at one end and an offset hook member 3 formed at the other end. It will be noticed that the shank 1 is provided adjacent the hook member 3 with an offset portion, indicated at 4, so that the hook 3 is disposed in a different plane from the shank 1. The shank 1 and integral parts thereof are preferably formed of tool steel, but it will be understood that any suitable form of material may be used without departing from the spirit of the invention.

Slidably mounted upon the shank 1 is a yoke 5, the ends of which are enlarged, as shown at 6, and arranged in spaced relation upon one side of the shank, said shank being preferably substantially flat, as indicated in cross section so that the yoke 5 will not rotate upon the same. A plate 7 is provided having pivot holes 8 formed therein, said plate being adapted to be disposed between the enlarged ends 6 of the yoke 5 and a pivot pin 9 is arranged within the perforated portions 6 and the openings 8 of the plate 7 to pivotally mount the plate therebetween. In placing the plate in position, it is preferred to have the lower longitudinal edge 10 of the plate arranged adjacent one of the faces of the shank 1 so that the corner portions of the plate will limit the pivotal movement of the same.

The outer end of the plate 7 is curved, as shown at 11, to provide a substantial hook member adapted to be arranged in opposed relation with the hook 3 so that the handles of a blacksmith's tong may be readily grasped and retained in an effective position.

From this description taken in connection with the accompanying drawings, it will be readily apparent that I have provided a simple and durable adjustable clamp whereby the handles of a blacksmith's or ice tong may be readily clamped in their effective positions and the hook member 11 may be quickly and readily adjusted upon the shank 1 to adapt the same to various sized objects. It will be noted that by having the longitudinal edge 10 arranged adjacent one of the flat faces of the shank 1, the corner portions of the plate 7 will limit the pivotal movement of the plate so that after the same has been once placed in its effective position, the corner portion engaging the shank, will limit the pivotal movement of the hook 11 and also retain the yoke 5 against sliding movement upon the shank.

My device as herein shown and described is extremely simple in construction and can be manufactured at a comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claim.

What I claim is:—

A device of the class described including a substantially flat shank, an offset hook member formed at one end, a yoke slidably mounted upon the shank, enlarged ends formed on said yoke and arranged in spaced relation, a plate mounted for pivotal movement between the yoke, a hook formed at the outer end of said plate and arranged in opposed relation with the hook on the shank and the inner longitudinal edge of the plate being disposed adjacent one of the flat faces of the shank whereby the corners of the plate will engage the shank and limit the pivotal movement of the plate and the sliding movement of the yoke when in its effective position.

In testimony whereof I hereunto affix my signature in the presence of two witnesses.

J. HARRY CRAIG.

Witnesses:
J. W. PAINE,
W. E. PAINE.

---

Copies of this patent may be obtained for five cents each, by addressing the "Commissioner of Patents, Washington, D. C."